Patented Sept. 7, 1954

2,688,620

UNITED STATES PATENT OFFICE 2,688,620

TRISULFURETED HETEROCYCLIC COMPOUNDS

Olivier Gaudin, Neuilly-sur-Seine, France

No Drawing. Application May 4, 1951,
Serial No. 224,671

1 Claim. (Cl. 260—327)

This invention relates to a new class of organic trisulfureted compounds and to processes for preparing such compounds. Certain of these compounds are particularly useful for therapeutic purposes.

This is a continuation-in-part of my application Ser. No. 763,167, filed July 23, 1947, now Patent No. 2,556,963.

The class of compositions which may undergo the trisufurization reaction of the present invention comprises mono and disubstituted propenes of the general formula $R_1R_2(C_3H_4)$, wherein $R_1$ and $R_2$ are any radicals which will remain stable under the conditions of the sulfurization reaction, such as hydrogen, or aryl or alkyl radicals, provided they are stable in the presence of sulfur at a temperature up to 250°; examples of such radicals are methyl, phenyl, naphthyl.

It is possible also that the aforementioned alkyl or aryl radicals may include functional groups, provided that these groups are stable under the conditions of the sulfurization reaction. Phenol functions and phenol ether functions may, for instance, be introduced in the $R_1$ or $R_2$ radical.

The invention comprises also processes of manufacturing such new compositions of matter.

It is well known that rather unstable additive compounds of sulfur are obtained by the action of sulfur on unsaturated organic compounds, such as for instance terpenes. However, the oily or tar-like substances thus obtained are not well defined chemical compounds; they are polymers with a very variable sulfur content from which no crystallized product has ever been obtained.

In the prior art, a large number of processes have been disclosed concerning action of sulfur on organic compounds: for instance, an immensely important technical process is the vulcanization of rubber by action of sulfur on crude rubber.

In this sort of sulfurization it is generally thought that the sulfur atoms add on unsaturated esters, such as double bonds.

In the process contemplated in this invention, the propenylidene ($C_3H_4$) group undergoes a substitution reaction, the hydrogen atoms being replaced by sulfur according to the following formula:

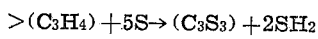

This reaction, from the chemical point of view, was completely unexpected, and nothing in the prior art gave the least clue that such reaction were possible.

In fact this reaction is remarkable in more than one respect:

(a) A three carbon chain is necessary. This contrasts with the sulfurization processes described in the prior art which related to particular carbon atoms in a molecule, or to double bonds which constitute a two carbon chain. Such actions on two carbon chains are disclosed, for instance, in Böttcher's application, A. P. C. Ser. No. 414,982, published April 20, 1943.

(b) Four hydrogen atoms are simultaneously replaced by three sulfur atoms.

It is quite unexpected that four hydrogen atoms must disappear simultaneously in a substitution reaction. In the general chemical knowledge it is well known that the ordinary course of substitution reactions is stepwise, one hydrogen being replaced after the other, and the corresponding steps being easily ascertained.

It is furthermore unexpected that four hydrogen atoms are replaced by three sulfur atoms, as sulfur is at least divalent and thus it is expected that four hydrogens must be replaced by two sulfur atoms at the most.

The invention is further distinguished from the prior art in that it comprises new compositions of matter of the general character set forth above, from which it is possible to derive pure and stable chemical compounds, some of which have been found to be of considerable therapeutic value. Such new compositions of matter can be obtained chemically pure in their crystallized form. Their molecule contains 3 atoms of sulfur.

The explanation of these unexpected facts has been found in my work, by which the structural formulae of the new trisulfureted products have been established. According to these results the trisulfurization reaction proceeds according to the following general formula:

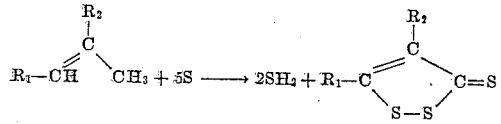

or alternatively:

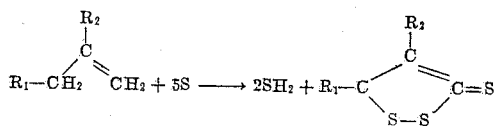

According to the last formula, the trisulfureted compound must be named dithiole-1-2-thiones-3, whose parent compound is:

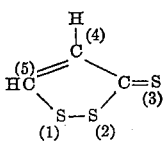

In the preceding general formula, the radicals $R_1$ and $R_2$ may be, for example, hydrogen atoms, alkyl, aryl, hydroxyaryl (phenol) or alkoxyaryl (phenol ether) radicals.

One of the new compositions of matter of the present invention which will be described more in detail below, results from the action of sulfur on anethol or on its isomer estragole, wherein $R_1$ is an anisyl ($CH_3O-C_6H_4$) and $R_2$ is an hydrogen atom. A crystallized substance has been isolated from this composition: Trithioparamethoxyphenylpropene. I have described this new composition of matter in "Comptes Rendus" of the Academy of Sciences of Paris, vol. 224, pages 479–481 and pages 577–578. The physiological and therapeutic properties of this new composition of matter were described by me in "Comptes Rendus" of the Academy of Medicine of Paris, vol. 131, pages 265–269.

Trithioparamethoxyphenylpropene has an extremely small toxicity. It requires a dose of 6 grams per kilogram of animal to cause the death of a guinea pig in 36 hours. That is over 9,000 times the normal human therapeutic dose. It may therefore be considered practically non-toxic.

The most important physiological properties of the new composition of matter reside in its very considerable choleretic action and in a diuretic action provoking the elimination of excess urea.

As a human therapeutic, this new composition of matter may, for instance, be administered in an average dose of 0.0125 gram for a total dosage of 0.0375 to 0.075 gram in a period of 24 hours. It may be taken in the form of pellets or pills or in any other form that can be administered through the mouth.

I have investigated 150 clinical cases and treated them with trithioparamethoxyphenylproprene, and I have obtained very satisfactory results, particularly in the case of hepatic disorder, gall bladder disorders, and allergies or dermatoses of hepatic origin.

My investigations have led to the following broad conclusions:

1. Trithioparamethoxyphenylpropene has a constant choleretic action;

2. In the case of every syndrome wherein there exists a functional trouble of the biliary secretion, the clinical improvement resulting from doses of 0.0375 to 0.075 gram per 24 hours is marked.

3. The most constant results are obtained in cholocystitis with or without associated manifestations.

In the manufacture of the new class of compositions of matter of the present invention, use may be made of elementary sulfur in any one of its varieties as well as of substances easily liberating sulfur, such as polysulfides or halogen sulfides, for instance.

As organic substances, use may be made of various compounds of vegetal origin such as estragole, eugenol, safrole, amongst the allyl compounds; anethol, iso-eugenole, iso-safrole, amongst the propenyl compounds.

It is also possible to employ natural oils containing any of the above-mentioned substances such as anise oil for anethol; alternatively, it is also practicable to use synthetic products of the general type set forth above, for instance allylphenols prepared according to the well known Claisen process.

The process according to the present invention may be carried out in the presence of suitable catalysts, such as vulcanization catalysts. It is also possible to operate in the presence of solvents.

The reaction is achieved by heating the reacting substances in an open receptacle up to temperatures varying according to the reacting substances chosen.

Example I

There is heated in an open receptacle a mixture of:

| | Grams |
|---|---|
| Sulfur | 160 |
| Anethol | 148 |

The reaction starts at about 148° C. and the temperature is raised above 200° C. A considerable liberation of hydrogen sulfide is observed. During the reaction, the mass becomes progressively thicker and thicker. After cooling, the mass is first treated with a solvent, such as boiling acetone, then filtered, and is allowed to crystallize.

After several fractionized crystallizations during which other solvents may be added, there is finally obtained a crystallized substance in red-brown needles having no smell but a bitter taste and melting at 108°–109° C. This substance is insoluble in water and slightly soluble in most of the organic solvents. Further, the new composition of matter is perfectly stable and does not oxidise in the air.

The reaction may be represented by the following formula:

$$CH_3O-C_6H_4-CH=CH-CH_3+5S \rightarrow CH_3O-C_6H_4-C_3HS_3+2H_2S$$

VIII
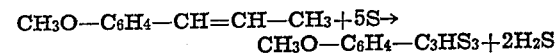

IX
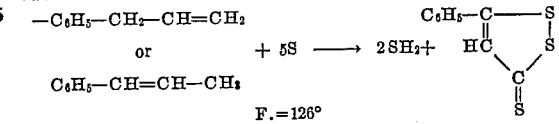

X
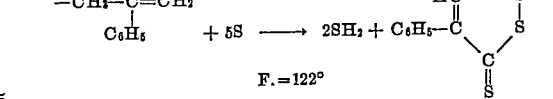

XI
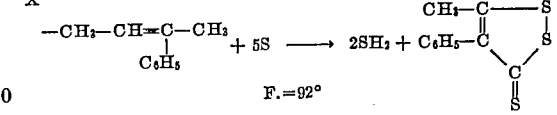

XII
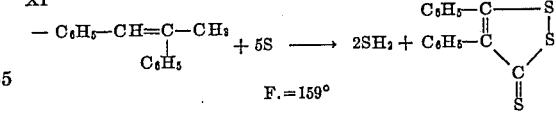

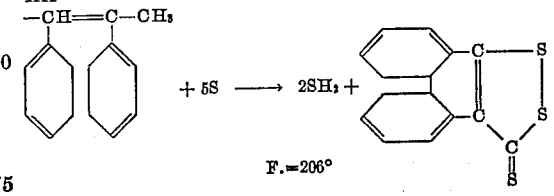

XIII 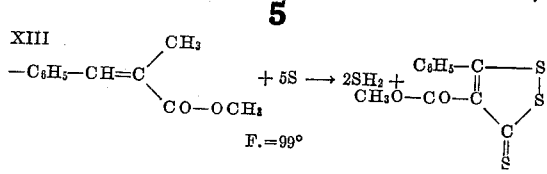
F.=99°

Example II

In the process of Example I, anethol is replaced by estragole. The resulting substance has in every respect the same aspect as the substance resulting from the process described in the preceding example. It melts also at 108°–109° C. either in pure state or mixed with the substance resulting from the anethol treatment.

The reaction may be represented by the following formula:

$$CH_3O-C_6H_4-CH_2-CH=CH_2+5S \rightarrow CH_3O-C_6H_4-C_3HS_3+2H_2S$$

In the foregoing processes, there is employed a quantity of sulfur corresponding to 5 atoms of sulfur per mol of organic substance.

There is no use in substantially increasing the proportions of sulfur since the surplus amount of sulfur does not react in the process in view of secondary reactions, and the surplus quantity of sulfur thus introduced would be found unaltered at the end of the reaction.

The amount of sulfur may thus be limited since it does not totally react but it is not desirable to reduce the quantity of sulfur below a certain proportion, since this would tend to reduce the yield of the reaction.

It is not desirable to work the reaction below 200° C. in the open air, since too low a temperature would slow down the reaction, thus increasing the duration of the heating period. The heat should not be applied too briskly since the gases produced might lead to an explosion. Further, too brisk a heating process lowers the efficiency of the reaction through the production of tar-like substances.

Some other examples of trisulfurization reactions in accordance with the invention as stated above and following the process steps disclosed in Example I are:

III 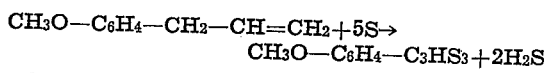

IV, IV'
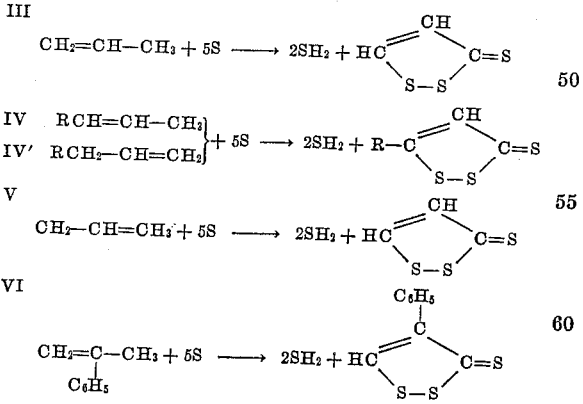

V

VI

VII
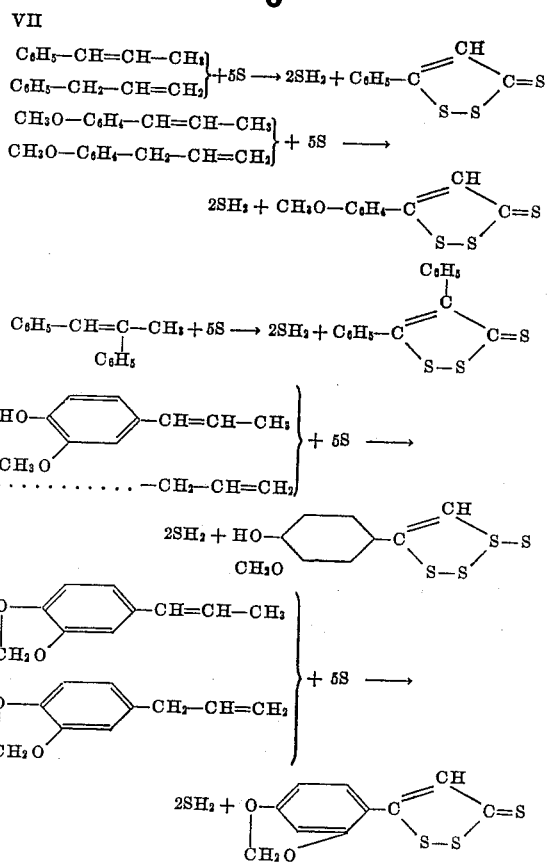

What is claimed is:

As a new composition of matter, a trisulfureted compound having the formula:

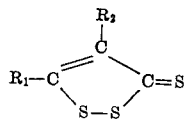

wherein $R_1$ and $R_2$ are selected from the group of hydrogen and any hydrocarbon radicals consisting of methyl, phenyl, naphthyl which will remain stable in the presence of sulfur at a temperature up to 250° C.

References Cited in the file of this patent

UNITED STATES PATENTS

| Number | Name | Date |
|---|---|---|
| 2,535,705 | Stevens et al. | Dec. 26, 1950 |
| 2,556,963 | Gaudin | June 12, 1951 |